No. 833,252. PATENTED OCT. 16, 1906.
C. F. SCHWENNKER.
COUPLING FOR ELECTRIC CABLES.
APPLICATION FILED FEB. 14, 1903.

WITNESSES:

INVENTOR:
Charles F. Schwennker,
by Atty.

UNITED STATES PATENT OFFICE.

CHARLES F. SCHWENNKER, OF SCHENECTADY, NEW YORK, ASSIGNOR TO GENERAL ELECTRIC COMPANY, A CORPORATION OF NEW YORK.

COUPLING FOR ELECTRIC CABLES.

No. 833,252.  Specification of Letters Patent.  Patented Oct. 16, 1906.

Application filed February 14, 1903. Serial No. 143,309.

*To all whom it may concern:*

Be it known that I, CHARLES F. SCHWENNKER, a citizen of the United States, residing at Schenectady, county of Schenectady, State of New York, have invented certain new and useful Improvements in Couplings for Electric Cables, of which the following is a specification.

The present invention relates to couplings for detachably connecting the ends of electric conductors together, and is especially useful in connecting the ends of the lead-cables of the larger sizes of dynamo-electric machines and transformers to the ends of their respective transmission-cables.

The object of the invention is to provide a detachable cable-coupling which will hold the ends of the cable together, so that the mechanical and electrical efficiency of the joint shall equal that of the continuous conductor, and which may also be readily coupled and uncoupled without the use of tools.

The invention will be more readily understood by reference to the accompanying drawings, forming a part of this specification, in which—

Figure 1:
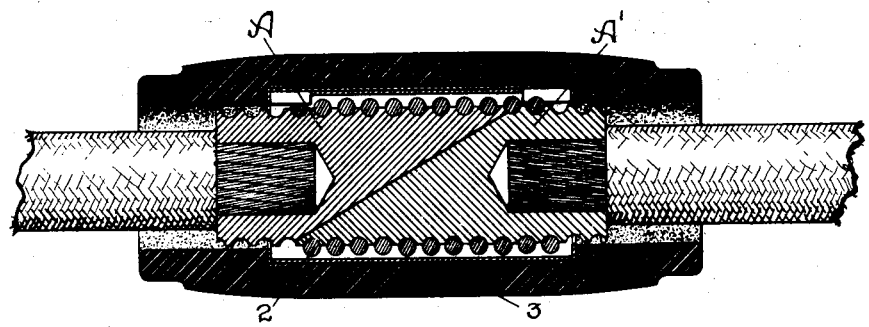
Figure 2:
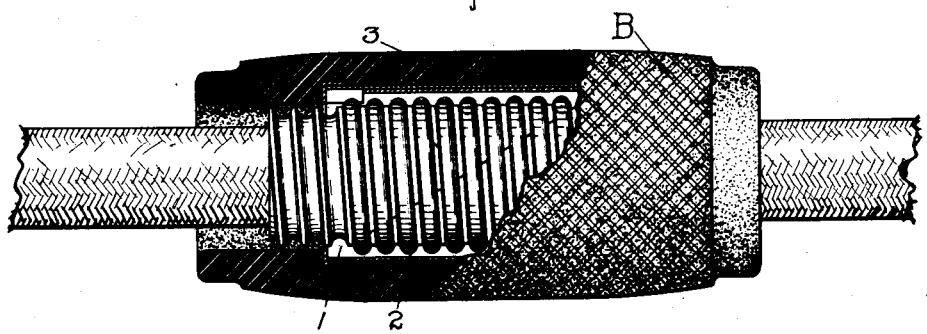
Figure 3:
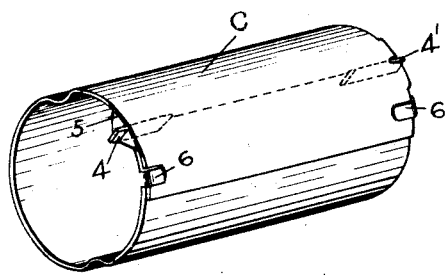

Figure 1 is an axial section of a coupling and its insulating-sleeve embodying one form of my invention. Fig. 2 is a broken elevation thereof, and Fig. 3 is a perspective view of the sheet-metal lining of the insulating-sleeve.

In the modifications shown in the drawings the ends of the cables are stripped of insulation and metallic conducting sections or thimbles A and A' are directly connected thereto by soldering or other suitable means. The thimbles A A' are cylindrical in shape and of a diameter somewhat greater than that of the insulated cable. The meeting ends of the thimbles are cut in planes oblique to their axes, so that they overlap each other when in position, and their cylindrical surfaces are provided with grooves, which when the thimbles are assembled form a helical recess or path for the reception of a coupling-spring 2. The coupling-spring 2 is made in the shape of a helix from thick hard-drawn copper or other good conducting spring-wire, with the radius of the helix somewhat less than the radius of the helical groove formed in the thimbles A A', so that when screwed upon the thimbles it tends to bind more or less tightly in the helical groove and makes good electrical contact therewith throughout its entire length.

As a consequence of the arrangement of the overlapped ends of the thimbles with the joint bridged by the conducting-spring at successive points throughout its length, as indicated in Fig. 2, efficient conduction is insured from thimble to thimble, even though contact between their ends may be defective or entirely wanting. Moreover, the spring by reason of its seating in the helical groove effectually locks the thimbles against separation by mechanical stresses.

An insulating-sleeve B is provided for inclosing the coupling and at the same time to serve as a means for screwing the spring 2 into and out of position, which consists of a cylindrical shell 3, of hard-rubber or fibrous insulation, molded about a sheet-metal cylinder C, in which the spring 2 is contained, and having an axial bore of a diameter somewhat larger than the diameter of the thimbles A A'. The metal cylinder C is made from a rolled-up sheet-steel punching having ears 4 4' bent in radially from its inner end. Locking-lugs 5 are formed on the side edges near the outer end of the punching and bent down on opposite sides of the ears 4 4' and act to hold said ears in position and the ends of the punching from sliding relatively to each other. Nibs 6 are formed on the side edges near the inner end of the punching and bent down over the corners of the opposite end to hold the ends from separating.

The ends of the metal cylinder may be provided with flanged washers or ferrules, if desired.

The helical spring 2 is located within the metal cylinder C and has the ends of its wire ground square to abut against the respective ears 4 and 4'.

It is to be noted that in whichever direction the sleeve B is rotated the ear at the rear or following end will be brought into engagement with the corresponding end of the helical spring 2 and tend to spring the rear convolutions of the spring out of contact with the groove 1 and lessen the friction between the spring and the thimbles A and A', thereby enabling the spring to be unscrewed with comparative facility.

The sleeve B may have its outer surface knurled to enable the hand to obtain a better hold thereof, and the length of the sleeve may be as much greater than the length of the coupling as desired.

My invention may be embodied in numerous constructions and is not restricted to the form shown in the drawings.

What I claim as new, and desire to secure by Letters Patent of the United States, is—

1. The combination of cylindrical metallic conductor-sections provided with overlapping ends and with grooves in the cylindrical sides which form a helical path when the sections are assembled, a helical spring screwed into said helical path and binding the sections together, and means to rotate said spring.

2. The combination of cylindrical metallic conductor-sections adapted to be connected to the ends of a wire or cable and having overlapping ends and side grooves which form a complete helical path when the sections are assembled, and a spring in the form of a helix whose radius is less than the radius of the helical path screwed into said path and binding the sections together.

3. The combination of a cylindrical metallic conductor section or sections provided with a helical groove, a helical spring screwed into said groove, and an insulating-shell surrounding the spring and provided with means for operatively engaging said spring.

4. The combination of a cylindrical metallic conductor section or sections, a helical spring screwed into frictional engagement with said section or sections, and an insulator surrounding said spring and provided with means for lessening the frictional engagement between the said spring and section or sections and causing the spring to rotate with said insulator.

5. The combination of a cylindrical metallic conductor section or sections provided with a helical groove, a helical spring screwed into said groove, and an insulating-shell surrounding said spring and provided with devices which engage the rear or following portion of the spring when the shell is rotated in one direction or the other to thereby lessen the friction between the spring and conductor sections and cause it to rotate with the said shell.

6. The combination of a cylindrical metallic conductor section or sections, a helical spring screwed into frictional engagement with said section or sections, a metal cylinder surrounding said spring and provided with ears for engaging the ends of said spring, and an insulating-shell connected to and surrounding said cylinder and extending beyond the ends thereof.

In witness whereof I have hereunto set my hand this 12th day of February, 1903.

CHARLES F. SCHWENNKER.

Witnesses:
 BENJAMIN B. HULL,
 HELEN ORFORD.